United States Patent [19]

Gunzelmann

[11] Patent Number: 5,966,370
[45] Date of Patent: Oct. 12, 1999

[54] METHOD AND SIGNAL EVALUATION MEANS FOR DETERMINING THE NOISE PART IN THE SIGNAL MIX OF THE RECEPTION SIGNAL OF A CDMA RECEPTION MEANS

[75] Inventor: Bertram Gunzelmann, Augsburg, Germany

[73] Assignee: Siemens Aktiengesellschaft, Munich, Germany

[21] Appl. No.: 08/881,333

[22] Filed: Jun. 24, 1997

[30] Foreign Application Priority Data

Jun. 27, 1996 [DE] Germany .......................... 196 25 859

[51] Int. Cl.$^6$ .................................................. H04B 7/216
[52] U.S. Cl. ........................ 370/320; 370/342; 375/200
[58] Field of Search ..................... 370/320, 335, 370/342, 209, 479, 441; 375/200, 206

[56] References Cited

U.S. PATENT DOCUMENTS 5,530,697    6/1996   Watanabe .

Primary Examiner—Douglas W. Olms
Assistant Examiner—David R Vincent
Attorney, Agent, or Firm—Hill & Simpson

[57] ABSTRACT

A method and a signal evaluator determine a noise part in a signal mix of a reception signal of a CDMA receiver. An additional spread code with which the reception signal is despread is formed at the reception side in addition to the individual spread codes of the individual CDMA connections. The resulting reference signal is subsequently evaluated and the noise part is determined from the reference signal.

15 Claims, 2 Drawing Sheets

Transmission Equipment

Reception Equipment

METHOD AND SIGNAL EVALUATION MEANS FOR DETERMINING THE NOISE PART IN THE SIGNAL MIX OF THE RECEPTION SIGNAL OF A CDMA RECEPTION MEANS

BACKGROUND OF THE INVENTION

CDMA methods (CDMA stands for code division multiple access) are standard transmission methods in satellite and mobile radio telephone systems for the radio interface between a transmission means and a reception means. CDMA methods are thereby band spread methods (spread spectrum) wherein a narrow-band useful signal is spectrally spread by a usually whole-number factor using a spread code and receives a noise-like characteristic. For unintended receivers, the band-spread signal represents additional noise that is additively overlaid on the useful signals from other transmission equipment. However, an intentional disturbance of the band-spread signal can also be opposed.

In standard CDMA receivers, the reception signal is despread or, respectively correlated with the spread code of the transmission means. A narrow-band jammer is spectrally spread by the despreading, so that its interfering effect is reduced by low-pass filtering.

The broadband transmission via the radio interface enables the reception means to resolve significantly more multi-path paths than would be possible given a narrow-band transmission. The transmission ensues at the same time for a plurality of connections and with the same carrier frequency. In a mobile radio telephone network, thus, a plurality of base stations can simultaneously maintain connections to a mobile station. Further improvements in the quality of the connection can thus be achieved.

This complexity of the reception conditions at the reception station with, usually, a plurality of propagation paths, with disturbances between the individual, transmitted symbols and with interference of further connections of the same carrier frequency, as well as noise disturbances, makes the separate interpretation of the parts for the useful signal and for the noise signals more difficult.

It is known to implement the measurement of the noise power using a reference channel. The reference channel is established either in a neighboring frequency band or, separated from the useful signals on the basis of time-division multiplex, in the same frequency band. However, only the thermal noise part of the disturbances can be identified with such a method, so that only an imprecise determination of the noise part is achieved for the CDMA method.

SUMMARY OF THE INVENTION

It is an object of the present invention to provide a method and signal evaluation means that improves the determination of the noise part for an CDMA reception means.

In general terms the present invention is a method for determining the noise part in the signal mix of a reception signal for a CDMA reception means, whereby an individual spread code is allocated to each CDMA connection. An additional spread code is formed. The reception signal is additionally despread to a reference signal with the additional spread code. The noise part is determined by evaluating the reference signal.

Advantageous developments of the present invention are as follows. The despreading is implemented for an in-phase component and for a quadrature component of the reception signal and the reference signals are evaluated by superimposition, potentially following a suitable reshaping.

The despreading is implemented at least over a part of a transmitted, digital symbol.

The despreading ensues over at least one transmitted digital signal and a power determination is undertaken for the respective reference signal.

The reference signals, potentially after a suitable reshaping, are added up for the in-phase component and for the quadrature component over a selectably defined window length.

A quasi-orthogonal code or a Walsh sequence is selected for the additional spread code.

The present invention is also a signal evaluation means for a mobile radio telephone system using the CDMA principle for determining the noise part in the signal mix of a reception signal. An individual spread code is allocated to each CDMA. A means for forming an additional spread code is provided. At least one despreading means for despreading the reception signal with the additional spread code forms a reference signal. An evaluation means for the reference signal determines the noise part.

Advantageous developments of the present invention are as follows.

Individual despreading means are provided for an in-phase component and for a quadrature component of the reception signal. The evaluation means is provided for evaluation of the reference signals by superimposition, potentially following a suitable reshaping.

The despreading means are fashioned such that the despreading is implemented at least over a transmitted digital symbol. A power determination for the respective reference signals is provided by the evaluation means.

The evaluation means is fashioned such that the reference signals, potentially following a suitable reshaping, are added up for the in-phase component and for the quadrature component over a selectively defined window length.

Inventively, an additional spread code with which the reception signal is despread is formed at the reception side in addition to the individual spread codes of the individual CDMA connections. The reference signal thereby arising is subsequently evaluated and the noise part is determined from the reference signal.

Taken into consideration by this determination of the noise part is that the disturbances that are produced by interferences between the connections or, respectively, between neighboring, transmitted symbols of a connection predominate in the CDMA method. Inventively, the determination of the noise part is implemented in the channel of the useful signals themselves and not separated by frequency-division or time-division multiplex. A high precision of the identified values thus derives.

According to an advantageous development of the invention, the despreading ensues for an in-phase and for a quadrature component of the reception signal. The reference signals for both components are subsequently evaluated by superimposition, potentially after a suitable conversion. As a result of this development, the invention can be realized in standard reception equipment for applications in mobile communication such as, for example, in mobile radio telephone systems.

The data set on whose basis the determination of the noise part is undertaken is, advantageously, at least a part of the transmitted digital signal over which the despreading is implemented. In addition to a time duration that corresponds to a symbol or a multiple thereof, parts of a symbol can also be evaluated for determining the noise part. The determination of the noise part thus need not ensue synchronously with the detection.

According to another advantageous development of the invention, a summing-up of the respective reference signal ensues over at least a transmitted digital signal, and the noise part is determined by a power determination for the respective reference signal. The summing-up averages the noise part over at least one symbol, so that deviations of the measured result for individual segments of a symbol from the average noise part are reduced. When the respective, summed-up reference signal (for example, for the in-phase and for the quadrature component) is subsequently subjected to a power determination, then the noise part is present in a form that is usually required for specifying the signal-to-noise ratio. The power determination is a reshaping that brings the determination result or potential intermediate results into and especially advantageous form.

When the determination result for the noise part for both components of the reception signal is to be specified in common, then quantities (signals that have proceeded from the reference signals by reshaping or the reference signals themselves) referring to the reference signals are advantageously added for the in-phase and for the quadrature component over a selectably defined window length. The window length is adapted correspondingly to the demands made of the precision of the determination (long window length means and averaging over many symbols) or of the speed of reaction to modifications on the radio interface—short window length means fast reaction to modified noise conditions.

An arbitrary spread code previously not yet employed can be utilized for the additional spread code. This spread code should not be used by any connection that could significantly influence the determination result. Advantageously, a quasi-orthogonal code is selected. Quasi-orthogonality is established when, in the despreading of a connection with a useful signal, interference terms in addition to the useful arise that are significantly smaller than the useful signal itself. Such a quasi-orthogonal spread code is especially suitable for an application according to the invention since the interference terms arising during the despreading indicate the noise part with high precision. The application of orthogonal spread sequences such as, for example, Walsh sequences is also possible since the orthogonality is only valid given adequate synchronization and such an orthogonality is not present due to the multi-path propagation in the mobile radio telephone channel.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

The present invention is explained by way of example with reference to a mobile radio telephone system that is operated according to the DS-CDMA method (DS stands direct sequence). However, it is likewise possible to combine the CDMA method with other transmission methods (TDMA, FDMA, SDMA for time, frequency and space division multiple access).

Figure 1:
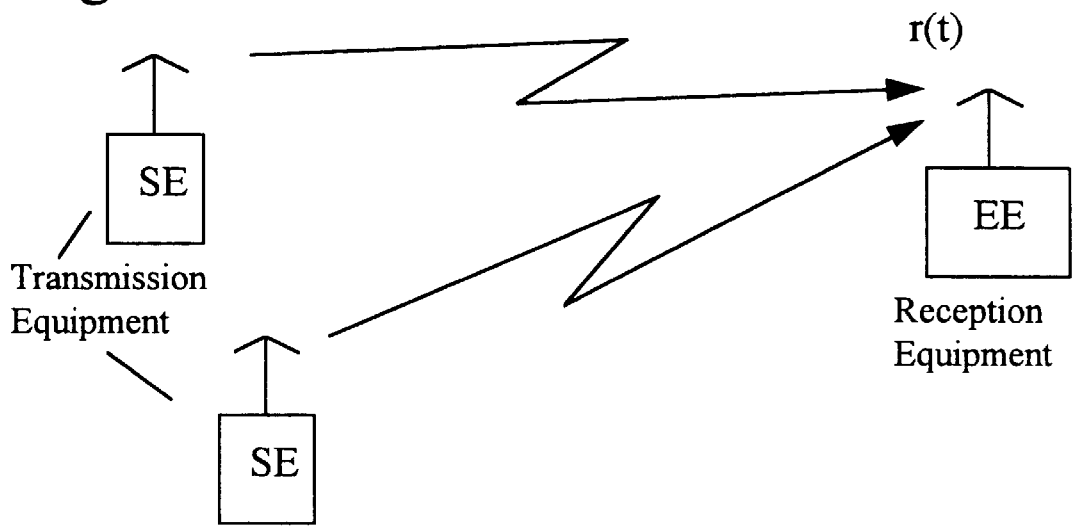
FIG. 1 is an exemplary illustration of the radio interface in a mobile radio telephone system with two connections from mobile stations to a base station.

According to FIG. 1, two mobile stations represent transmission equipment SE of the mobile radio telephone system that maintain a connection to a base station at the same time with a common carrier frequency. Only the reception case for the base station is considered, so that the base station having the CDMA reception means EE accepts reception signals r that have a time dependency (t stands for the time).

Figure 2:
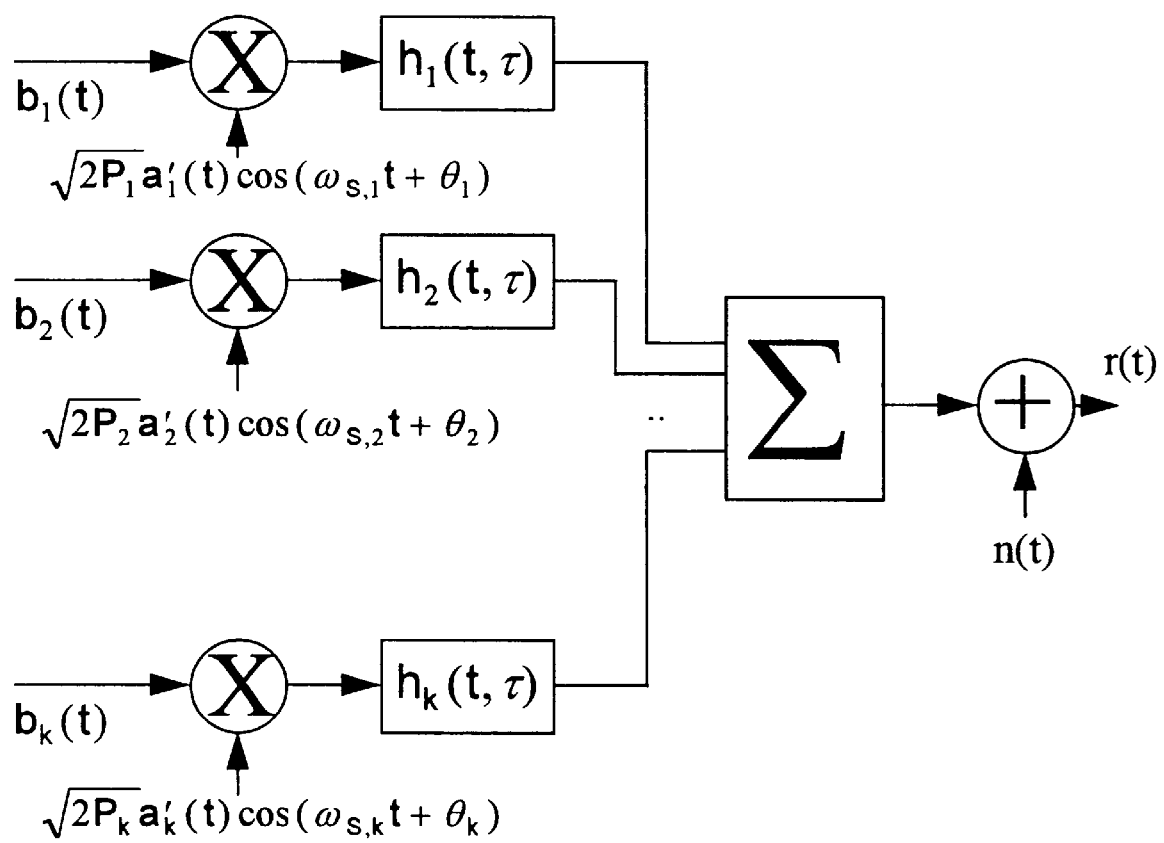
FIG. 2 is a block circuit diagram for the creation of the signal mix of the reception signal given a CDMA transmission method.

FIG. 2 shows a block circuit diagram for the connection between mobile stations and the base station, what is referred to as the uplink. The invention, however, can likewise be applied to the connection from a base station to a mobile station. K subscribers (mobile stations) simultaneously send time-dependent symbols $b_{1,2..k}$ having the transmission power $P_{1,2..k}$ following a spread with the spread code $a'_{1,2..k}$ individual for the respective connection and modulated with the common carrier frequency $\omega_s$, that, however, can have slight, individual deviations with reference to frequency and phase $\theta$. These signals allocated to the individual connections continue to be subject to a multi-path propagation that can be modeled by a weighting with channel coefficient $h_{1,2..k}$ characteristic of each propagation path. T thereby indicates the individual delay of the individual propagation path l. A superimposition of said signals occurs on the air interface and a noise signal n is additionally added. The reception signal r thus arises, as acquired in the reception means:

$$r(t) = \sum_{k=1}^{K} \sum_{l=1}^{L} R\left[\sqrt{2P_k b_k}\left(t - \tau_k^{(1)}\right) a'_k\left(t - \tau_k^{(1)}\right) h_k(t, \tau_k^1) e^{j\omega_s k^t}\right] + n(t).$$

for K Subscribers and L Propagation Paths

A typical CDMA reception means is composed of a quadrature demodulator and of a despreader or correlator that is adapted to the spread codes $a'_k$ of the transmission equipment. After the baseband conversion or, respectively quadrature demodulation, the despreading occurs with individual spread codes $a_k$ for the connections that are present in the reception means. The output signal of the correlator derives at time nT (in the following, n references discrete points in time):

$$z_k^{(1)}(n) = \int_{(n-1)T+\tau_k^{(1)}}^{nT+\tau_k^{(1)}} r(t) a_k\left(t - \tau_k^{(1)}\right) a'_k\left(t - \tau_k^{(1)}\right) h_k(t, \tau_k^1) e^{j\omega_s k^t} dt,$$

whereby $\omega_E$ represents the radian frequency of the receiver oscillator.

A division into the following terms is thereby possible for the output signal of the correlator referred to the subscriber K:

$$z_k^{(1)}(n) = d_k^{(1)}(n) + i(n) + \eta(n),$$

whereby $d_k^{(1)}$ (n) represents the useful signal of the $k^{th}$ subscriber and $l^{th}$ propagation path. The term i(n) stands for the sum of the multiple access interferences, including potential inter.-symbol interferences, i.e. for interferences that arise due to the despreading. The thermal noise part is described with the term $\eta(n)$.

Whereas the reception means only evaluates the useful part $d_k^{(1)}$ in order to, for example implement the channel estimation in a RAKE receiver and the detection, the interferences i(n) and the thermal noise part η(n) act as interference. Since the noise power is likewise required for the implementation of the channel estimating and for the implementation of the detection of the transmitted digital signals, a determination of the noise part in the signal mix of the reception signal ensues according to the present invention.

For determining the noise part, the reception means EE accepts the reception signals r via an antenna A and, as indicated, implements the demodulation with a transmission into the base band. The reception means EE contains a signal evaluation means DSP that, for example, can be fashioned as a digital signal processor or as an application-specific circuit (ASIC). A despreading means ENT, an evaluation means AW and a memory means SP are available inside the signal evaluation means DSP. At least parts of these means ENT, AW, SP can likewise be realized by appropriate algorithms in the digital signal processor DSP.

As a result of the digital signal processor DSP, an additional spread code $a_R$ is formed and deposited in the memory means SP. The additional spread code $a_R$ can also be communicated to the signal processor DSP and stored thereat, so that the additional spread code $a_R$ is subsequently formed merely by being read out from the memory means SP. A despreading of the reception signal R occurs in the despreading means ENT, so that a reference signal rs that is supplied to the evaluation means AW is formed. Subsequently, the noise part σ is determined in the evaluation means AW. The identified noise part σ, for example, can be employed in order to define the signal-to-noise ratio for the respective connections and in order to undertake a matching of the reception parameters. The change of radial area or an adaptation of the transmission part can ensue. Further, the identified noise part σ allows the improvement of the channel estimating or the improvement of the detection for a maximum a posteriori detector.

Figure 3:
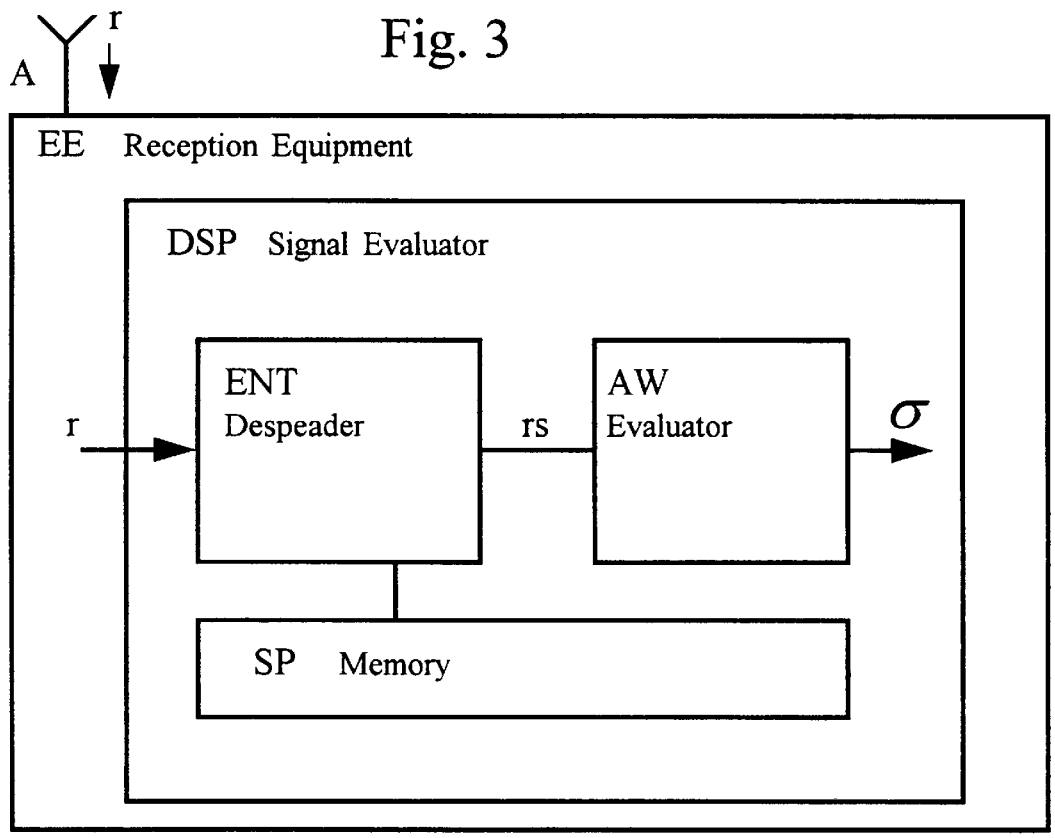
FIG. 3 is a block circuit diagram of a CDMA reception means with signal evaluation means.
Figure 4:
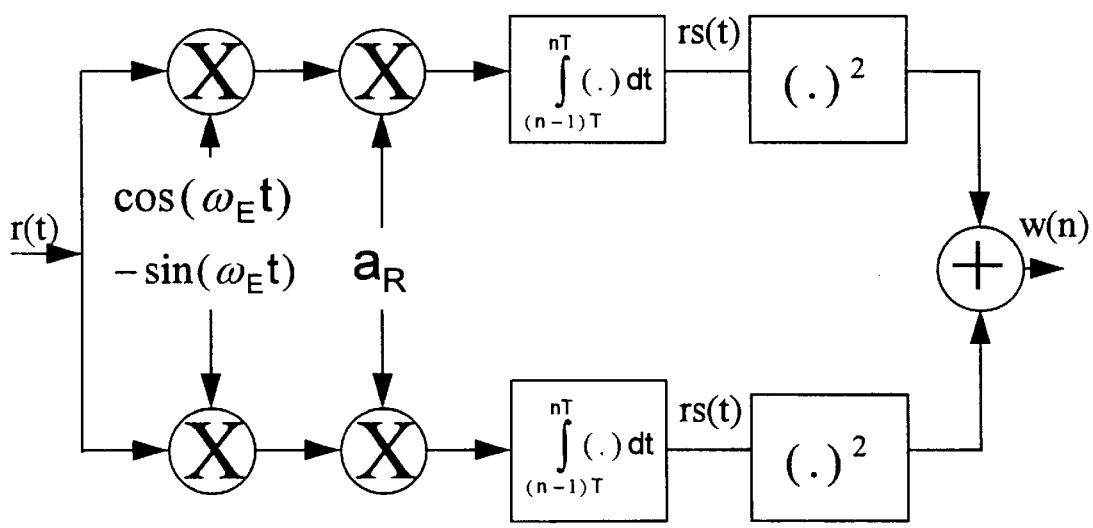
FIG. 4 is a block circuit diagram for the determination of the noise part in the signal mix of the reception signal.

The determination of the noise part σ shall be illustrated with reference to FIG. 4. The time-dependent reception signal r is converted into an in-phase and into a quadrature component in the baseband. This occurs in that a signal is multiplied in mixer stages by the reception-side carrier frequency (phase-shifted by approximately 90° for the quadrature component). Subsequently, both components are despread in the despreading means ENT of FIG. 3 with the additional spread code $a_R$, including an integration (summing-up) over a period duration T, as a result whereof respective reference signals rs are formed. For despreading, the correlators known from CDMA reception means can be utilized.

This despreading corresponds to the codes for the connections of the useful signals. However, a code that corresponds to no connection to be interpreted is employed. The additional spread code $a_R$ is preferably a code that is quasi-orthogonal to the other spread codes $a_K$, for example a GOLD sequence, or a Walsh sequence.

For a power determination for the noise part, the integration result, the reference signal rs, is respectively squared. Subsequently, the reference signals of both components reshaped into power values are added up. A power value w(n) is thus available for further evaluation:

$$w(n) = \left| \int_{(n-1)T}^{nT} r(t)a_R(t)e^{-j\omega_E t} dt \right|^2$$

The period duration T can thereby cover only parts of a transmitted symbol or a complete symbol as well; the latter when a synchronous handling is preferred for symbol evaluation.

Due to the fixed time reference between the reference signal R and the locally formed, additional spread code $a_R$, a set averaging is implemented. Given employment of a stationary, additional spread code $a_R$, this acts like a passive correlator and additionally creates a time averaging.

When the time-dependency of the radio channel is low, then a further low-pass filtering of the estimated quantity w(n) for the power value of the noise part can be implemented by averaging over a time window:

$$\hat{\sigma}^2 = \frac{1}{N} \sum_N w(n)$$

whereby N stands for the window length of the low-pass filter. This low-pass filtering also lies at hand since the interference terms f(n) are time-dependent. The length of the estimation window can be matched to the time-invariance of the radio channel and to the required precision for the result of the estimation.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for determining a noise part in a signal mix of a reception signal for a CDMA receiver, comprising the steps of:

allocating an individual spread code to each CDMA connection;

forming an additional spread code;

despreading the reception signal;

additionally despreading the reception signal to a reference signal with additional spread code; and determining a noise part by evaluating the reference signal.

2. The method according to claim 1, wherein the despreading is implemented for an in-phase component and for a quadrature component of the reception signal and wherein the reference signals are evaluated by superimposition, following a suitable reshaping.

3. The method according to claim 2, wherein the reference signals are added up for the in-phase component and for the quadrature component over a selectably defined window length.

4. The method according to claim 1, wherein the despreading is implemented at least over a part of a transmitted, digital symbol.

5. The method according to claim 1, wherein the despreading ensues over at least one transmitted digital signal and a power determination is undertaken for the respective reference signal.

6. The method according to claim 1, wherein the additional spread code is one of a quasi-orthogonal code or a Walsh sequence.

7. A signal evaluator for a mobile radio telephone system that uses a CDMA principle for determining a noise part in a signal mix of a reception signal, comprising:

an individual spread code allocated to each CDMA;

device for forming an additional spread code;

at least one despreading device for despreading the reception signal and for additionally despreading the reception signal with the additional spread code to form a reference signal; and an evaluation device for the reference signal for determining the noise part.

8. The signal evaluator according to claim 7, wherein the evaluator further comprises: individual despreading devices for an in-phase component and for a quadrature component of the reception signal, whereby the evaluation device is provided for evaluation of the reference signals by superimposition.

9. The signal evaluator according to claim 7, wherein the despreading devices are structured such that despreading is implemented at least over a transmitted digital symbol; and wherein a power determination for respective reference signals is provided by the evaluation device.

10. The signal evaluator according to claim 7, wherein the evaluation device is structured such that the reference signals, are added up for the in-phase component and for the quadrature component over a selectively defined window length.

11. A method for determining a noise part in a signal mix of a reception signal for a CDMA receiver, comprising the steps of:

allocating an individual spread code to each CDMA connection;

forming an additional spread code;

despreading the reception signal;

additionally despreading the reception signal to a reference signal with additional spread code, the despreading being implemented for an in-phase component and for a quadrature component of the reception signal;

determining a noise part by evaluating the reference signal by superimposition.

12. The method according to claim 11, wherein the reference signals are added up for the in-phase component and for the quadrature component over a selectably defined window length.

13. The method according to claim 11, wherein the despreading is implemented at least over a part of a transmitted, digital symbol.

14. The method according to claim 11, wherein the despreading ensues over at least one transmitted digital signal and a power determination is undertaken for the respective reference signal.

15. The method according to claim 11, wherein the additional spread code is one of a quasi-orthogonal code or a Walsh sequence.

* * * * *